L. C. BAYLES.
VALVE SPINDLE RETAINING DEVICE.
APPLICATION FILED MAY 28, 1921.
1,428,745. Patented Sept. 12, 1922.
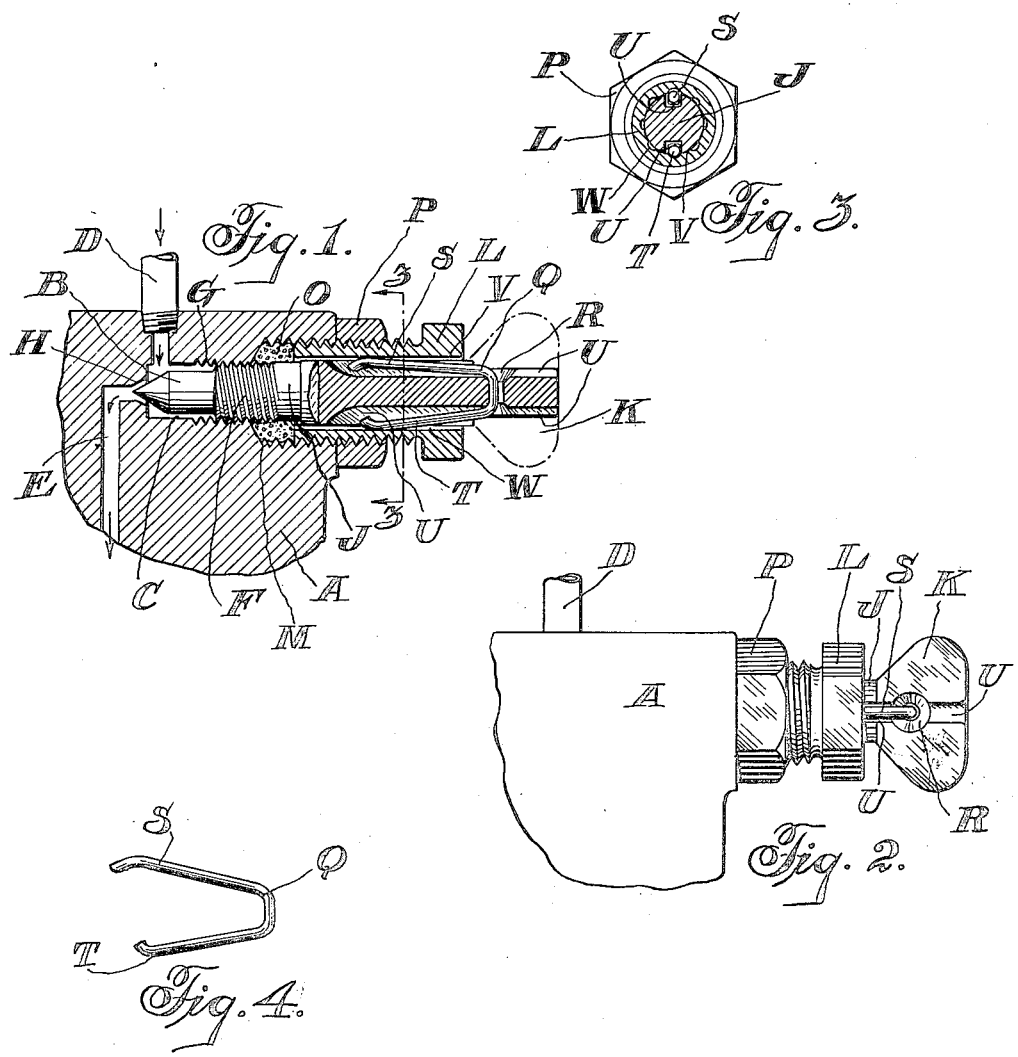
INVENTOR
Lewis C. Bayles.
BY
Herbert G. Ogden
ATTORNEY Patented Sept. 12, 1922.

1,428,745

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

VALVE-SPINDLE-RETAINING DEVICE.

Application filed May 28, 1921. Serial No. 473,416.

*To all whom it may concern:*

Be it known that I, LEWIS C. BAYLES, a citizen of the United States, a resident of Easton, county of Northampton, and State of Pennsylvania, have invented a certain Valve-Spindle-Retaining Device, of which the following is a specification, accompanied by drawings.

This invention relates to retaining devices for valve spindles, but more particularly to a device for retaining a screw threaded valve spindle in the bore of a valve casing and resisting the tendency of the valve spindle to rotate or unscrew due to vibration and fluid pressure.

In a machine which is subject to excessive vibration, as a fluid actuated rock drill of the hammer type for instance, and in other machines, difficulty has been experienced in retaining such devices as controlling valves and valve spindles in their casings due to the vibration. A screw threaded valve spindle may become partially unscrewed which varies the valve adjustment, or it may become entirely unscrewed and lost from the machine.

Lock nuts and various similar devices have been provided for locking a valve spindle in position, but they have proved unreliable and unsatisfactory, and the objects of the present invention are to secure a reliable and positive device which can be depended upon to prevent unscrewing or loss of the valve and valve spindle under excessive vibration.

Further objects of the invention will hereinafter appear and to the ends set forth herein the invention consists of the features of construction and arrangement of parts described and claimed in the following specification and shown in the accompanying drawing, forming a part hereof, illustrating one preferred practical embodiment of the invention, in which Figure 1, is a longitudinal central sectional view through a valve embodying the present invention, Figure 2, a side elevation of a portion of a rock drill casing showing an exterior view of the device as it appears in use, Figure 3, a section on the line 3—3 of Figure 1, looking in the direction of the arrows; and Figure 4, a plan view of the U-shaped spring retainer.

The invention is shown as applied to a needle valve the essential parts of which are of the usual form as employed in fluid actuated hammer drills, for instance. A valve having the general characteristics of this particular type is shown in Figure 3, of the patent to W. A. Smith, No. 1,372,915, dated March 29, 1921. However, the valve as shown herein embodies certain specific details of construction over that shown in the patent referred to in addition to the features which are inherent in the present invention.

Referring to the drawings, a portion of the cylinder casing A of a fluid actuated hammer drill is shown having a needle valve B, located in a valve chamber C, which needle valve regulates the flow of fluid under pressure passing from a conduit D leading into the chamber C and thence to a passage E leading from said chamber C to the point of use in the machine. The needle valve B is provided with a screw threaded portion F cooperating with a corresponding screw threaded portion G of the walls of the chamber C so that the needle valve B may be rotated and is longitudinally adjustable to and from its seat H.

The body portion J of the valve is in the form of a spindle, preferably of slightly greater diameter than the needle portion B, having a wing or thumb nut K for the purpose of rotating the valve. The valve spindle J is surrounded by an externally threaded hollow bushing L which is screwed into the internally threaded enlarged chamber M of the cylinder portion A. The bushing L thus forms a part of the valve casing. Packing O is inserted at the base of the chamber portion M surrounding the valve portion F and is held tight by rotation of the bushing L, a lock nut P threaded on the bushing L maintaining the adjustment of the bushing.

The construction just described is that usually employed, in which the compression of the packing O against the screw threaded valve portion F is depended upon to resist the rotation of the valve spindle. This construction however, has ben found unsatisfactory, for the vibration of the machine causes rotation of the valve even with tight packing and furthermore, the packing quickly loosens rendering it useless so far as retaining the adjustment of the valve is concerned, and it becomes necessary to frequently loosen the lock nut P and tighten the bushing L.

Suitable means for preventing unintentional rotative movement, and consequently loosening of the valve spindle, consists in the provision of a holding device or retainer, interposed between the valve spindle and the walls of the valve casing.

This retainer preferably consists of a wire spring Q which passes through an aperture R having flared openings in the thumb piece K and is then bent into angular U-shaped form about the valve spindle. The inwardly projecting spring arms S and T of the retainer have their ends bent slightly inward. One of said arms, that lettered S, is preferably longer than the other, and the tension between the arms is relatively stiff.

The sides of the valve spindle J are preferably cut away or recessed at diametrically opposite sides forming longitudinal grooves U of sufficient length and depth to receive the arms S and T of the spring retainer. The internal wall V of the bushing L which forms part of the valve enclosing casing has a plurality of longitudinal flutes or depressions W. These flutes are adapted to be engaged by the ends of the spring arms S and T as shown in Figure 3, the arms bearing against the wall of the casing and thus holding or retaining the valve spindle J against rotative movement and maintaining the predetermined adjustment of the needle valve B.

When inserting the valve in the casing the expansible arms S and T are held depressed within the grooves U. The longer arm S is then first inserted and is followed by the shorter arm T, the difference in length between the arms materially facilitating the assembly of the parts.

The valve is readily rotated by means of the thumb piece K to effect a predetermined adjustment of the needle valve, the ends of the spring arms riding over the edges of the flutes and coming to rest in the flutes. The adjustment thus fixed can not be disturbed by the ordinary vibration of the machine.

The present form of valve retainer has been found efficient in use, is simple in construction and cheap to manufacture. While a U-shaped spring on the valve cooperating with longitudinal flutes in the bushing has been found to be one suitable and preferred form of device for carrying out the objects of the invention, other forms of devices may occur to those skilled in the art as equivalent constructions without departing from the spirit and scope of the invention as defined in the appended claims; hence it is not desired to limit the invention to the form herein specifically shown and described.

I claim:

1. A device for retaining a screw threaded valve spindle in its casing, comprising a retainer in the form of a U-shaped spring adapted to pass through the spindle, the spring arms of said retainer being adapted to enter the bore of the valve casing and bear against the walls thereof to resist the tendency of the valve spindle to rotate due to vibration.

2. A device for retaining a screw threaded valve spindle in its casing, comprising a retainer in the form of a U-shaped spring adapted to pass through the spindle, one spring arm of the retainer being longer than the other to facilitate entry of both arms into the bore of the valve casing as the valve and spindle are inserted, said arms being adapted to bear against the walls of the casing and resist the tendency of the valve spindle to rotate due to vibration.

3. In a device of the class described, a casing having a bore formed with internal flutes, a valve and valve spindle threaded into said casing, and a retainer in the form of a U-shaped spring adapted to pass through the spindle, the spring arms of said retainer being adapted to enter the bore of the casing and engage the flutes with spring pressure to resist the tendency of the valve spindle to rotate due to vibration.

4. A device of the character described comprising a valve casing, a rotatable longitudinally adjustable valve located in said casing and controlling the passage through the valve casing and an expansible angularly bent U-shaped spring attached to said valve said spring having arms parallel with the opposite longitudinal sides of said valve, said arms engaging the internal walls of the casing for preventing free unintentional rotative movement of the valve and maintaining a predetermined adjustment of said valve.

5. In combination with a longitudinally adjustable valve screw threaded in its casing, a valve retainer comprising a spring bent to form a U-shaped member about and attached to said valve, the arms of said U-shaped spring being parallel with opposite longitudinal sides of the valve and engaging the internal walls of the casing to hold the valve in a predetermined position and prevent unintentional rotative movement of the valve.

6. A device of the character described comprising a valve casing, an internally fluted bushing at the outer end of said casing, a rotatable longitudinally adjustable valve threaded in said casing and controlling the passage through the casing, said valve passing through said bushing, and a spring bent to form a U-shaped member passing through said valve the arms of said spring being adapted to engage the flutes of the bushing with spring pressure to positively prevent unintentional rotative movement of the valve and maintain the same in a predetermined position.

In testimony whereof I have signed this specification.

LEWIS C BAYLES.